(12) United States Patent
Echt et al.

(10) Patent No.: US 7,608,660 B2
(45) Date of Patent: Oct. 27, 2009

(54) METHOD OF COATING PAPER WITH COPOLYMERS OF VINYL ALCOHOL AND ITACONIC ACID

(75) Inventors: Elliott Echt, Wilmington, DE (US); Peter A. Morken, Wilmington, DE (US); G. Michael Collins, League City, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/077,297

(22) Filed: Mar. 17, 2008

(65) Prior Publication Data

US 2008/0171825 A1 Jul. 17, 2008

Related U.S. Application Data

(62) Division of application No. 11/012,516, filed on Dec. 15, 2004, now Pat. No. 7,371,796.

(60) Provisional application No. 60/529,855, filed on Dec. 15, 2003.

(51) Int. Cl.
  *D21H 19/60* (2006.01)
  *C09D 131/04* (2006.01)
  *C09D 133/02* (2006.01)
  *C09D 133/08* (2006.01)

(52) U.S. Cl. ............ 524/557; 524/561; 524/564; 524/803; 526/318.3; 526/318.4; 526/318.44; 526/318.5; 526/329.5; 526/330

(58) Field of Classification Search ............ 524/557, 524/561, 564, 803; 526/318.3, 318.4, 318.44, 526/318.5, 330, 329.5
See application file for complete search history.

(56) References Cited

U.S. PATENT DOCUMENTS

| | | | |
|---|---|---|---|
| 4,747,976 A | 5/1988 | Yang et al. | |
| 4,885,105 A | 12/1989 | Yang et al. | |
| 5,057,570 A | 10/1991 | Miller et al. | |
| 5,527,852 A | 6/1996 | Maruyama et al. | |
| 5,712,334 A | 1/1998 | Watanabe et al. | |
| 7,022,656 B2 | 4/2006 | Verrall et al. | |
| 2004/0186034 A1 | 9/2004 | Verrall et al. | |
| 2005/0154120 A1 | 7/2005 | Echt et al. | |
| 2006/0035042 A1 | 2/2006 | Morken | |

FOREIGN PATENT DOCUMENTS

| | | |
|---|---|---|
| EP | 0 291 198 A2 | 11/1988 |
| EP | 0 461 635 A1 | 12/1991 |
| EP | 0 587 114 A1 | 3/1994 |
| GB | 1143974 A * | 2/1969 |
| GB | 2109704 A * | 6/1983 |
| JP | 57117697 | 7/1982 |
| JP | 57117697 A * | 7/1982 |
| JP | 03027198 | 2/1991 |
| JP | 03234754 | 10/1991 |
| JP | 03234754 A * | 10/1991 |
| WO | WO 94/04656 | 3/1994 |
| WO | WO 2004/085600(A1) | 10/2004 |
| WO | 2005/059248 A1 | 6/2005 |

OTHER PUBLICATIONS

C. A. Finch, "Chemical Reactions and Stereochemistry of Polyvinyl Alcohol", Polyvinyl Alcohol, pp. 269-312, John Wiley & Sons Ltd., 1992.
R. K. Tubbs, "Polyvinyl Alcohol Acrylate and Methacrylate Copolymers and Their Applictions in Textile Sizing and Films", Polyvinyl Alcohol, pp. 361-402, John Wiley & Sons Ltd., 1992.

* cited by examiner

*Primary Examiner*—Kelechi C Egwim

(57) ABSTRACT

The present invention is a composition useful for coating the surface of paper wherein the coating composition is an aqueous solution comprising less than 40 wt % water and consisting essentially of a polyvinyl alcohol copolymer that is at least about 95% hydrolyzed, and a process for preparing the same.

13 Claims, No Drawings

METHOD OF COATING PAPER WITH COPOLYMERS OF VINYL ALCOHOL AND ITACONIC ACID

This application is a divisional of U.S. patent application Ser. No. 11/012,516, filed Dec. 15, 2004, which claims priority from U.S. Provisional Application No. 60/529,855, filed Dec. 15, 2003, now expired, the entire contents being incorporated herein by reference.

BACKGROUND OF THE INVENTION

1. Field of the Invention

This invention relates to polyvinyl alcohol copolymers for use in paper coatings.

2. Description of the Prior Art

In the process of producing coated paper, paper coatings are applied to the surface of a paper product to obtain the coated paper. The paper coating can include various components, including polyvinyl alcohol. Other components may include calcium carbonate, clays such as hydrous aluminum silicates of the kaolin variety or hydrated silica clays, titanium dioxide, blanc fixe, lithopone, and zinc sulfide. Other components of a conventional paper coating composition can include, for example, mineral pigments, pigment binders, thickeners, humectants, and lubricants—all in various proportions. Paper coatings used to produce coated papers can include high percentages of solids, and such solids levels can approach 70%. Polyvinyl alcohol can be used as a clear coat and also as a co-binder with latex in coated papers. Typically in paper coatings applications polyvinyl alcohol is used and applied as an aqueous composition that typically comprises other components. It can be, and often is, desirable to use high solids paper coatings for more efficient production of coated paper.

However, polyvinyl alcohol (PVA) is difficult to prepare as an aqueous solution of more than 30% solids, and above this level dispersing the polyvinyl alcohol in water becomes very difficult and the resulting solution viscosity very high. To obtain even this degree of solution, an aqueous mixture that includes PVA is typically heated, or "cooked" to achieve complete solution and the resulting PVA solution is then added to a paper coating composition. In paper coatings applications, the amount of water required to deliver an aqueous PVA solution is detrimental, or at least undesirable, in the paper coating composition. It is much preferred for paper coatings applications to use as little water as possible and as a result mixtures having 70% or more of water are not desirable in paper coatings applications. The difficulties in dissolving polyvinyl alcohol in water can cause problems with the process of applying the coating. For example, there can be difficulties getting PVA dispersed into the coating mixture and evenly distributed on the paper surface with insoluble PVA.

U.S. Pat. No. 5,527,852 describes a particulate PVA slurry as a paper coating agent which can be prepared using PVA having an average particle diameter of from 0.01 to 1 µm. The PVA slurry described therein is said to be useful when applied to paper as a slurry wherein the PVA is substantially insoluble in cold water, and thereafter dissolves during the drying process to form a film on the surface of the paper.

U.S. Pat. No. 5,057,570 describes a PVA that is partially hydrolyzed, which can be added without additional water to a paper coating composition, and thereby avoids increasing the amount of water in the paper coating composition. However, it can be desirable to use fully hydrolyzed PVA rather than partially hydrolyzed PVA. Also, it can be desirable to use a higher molecular weight PVA polymer than described in U.S. Pat. No. 5,057,570. Each of these differences can reduce the solubility of the PVA in water, and thus negate the ability to dissolve the dry PVA in a high solids paper coating composition. It is also recognized that if the partially hydrolyzed PVA is not given time to fully dissolve, quality problems with the coating or the coated paper can be encountered.

US 2004/0186034 describes a water-soluble PVA copolymer film composition.

It can be desirable to dissolve a fully hydrolyzed PVA having a relatively high degree of polymerization in a high solids paper coating composition.

SUMMARY OF THE INVENTION

In one aspect, the present invention is a composition useful for coating the surface of paper wherein the coating composition is an aqueous composition comprising less than 40 wt % water and consisting essentially of a polyvinyl alcohol copolymer that is at least about 95% hydrolyzed.

In another aspect, the present invention is a method for preparing a high-solids PVA-containing paper coating composition comprising the step of: adding, as a dry solid component, a PVA copolymer comprising at least about 1 mol % of itaconic acid as a comonomer and completely dissolving the PVA copolymer.

In another embodiment, the present invention is a method for preparing a high-solids PVA-containing paper coating composition comprising the step of: adding, as a dry solid component, a PVA copolymer that is a terpolymer comprising less than about 8 mol % of itaconic acid as a comonomer.

In another aspect the present invention is a terpolymer composition comprising vinyl alcohol, methyl acrylate, and itaconic acid moieties, wherein: (i) the terpolymer comprises less than about 5 mol % of vinyl acetate moieties; (ii) the methyl acrylate fragment is present in an amount of at least about 1 mol % up to about 9 mol %; (iii) the itaconic acid is present in an amount of at least about 1 mol % up to about 9 mol %, and, (iv) the methyl acrylate is in the form of a lactone.

DETAILED DESCRIPTION

In one embodiment, the present invention is a high solids paper coating composition comprising fully hydrolyzed PVA. For the purposes of the present invention, "high solids" as the term is used herein shall denote aqueous compositions which are prepared by dissolving or dispersing solid materials in water, and where water is the only component that is a liquid at 25° C. and 1 atmosphere pressure. A high solids coating composition of the present invention is one that comprises less than about 40 wt % water. It can be desirable in the practice of the present invention to use as little water as possible, and so any amount of water which is less than about 40 wt % of the total coating composition is desirable, with the proviso that the composition comprises fully hydrolyzed PVA copolymer that is completely dissolved in the aqueous phase of the coating composition.

A coating composition of the present invention can comprise or consist essentially of other materials such as minerals and pigments, for example, that are not completely dissolved and thus provide a coating suspension, slurry, or dispersion. For the purposes of the present invention no distinction will be made between a suspension, slurry, or dispersion and each will be considered as included in the term "coating composition".

A coating composition of the present invention can additionally comprise other components that are known and conventional for use in paper coating applications. For example pigments, minerals, fillers, pH control agents, surfactants, latexes, or dyes—any of which can be considered conventional to paper coatings applications—are contemplated as useful in the practice of the present invention.

A coating composition of the present invention can comprise PVA solids up to about 20 wt % of the mineral portion of the coating. In one embodiment, the PVA solids of the present invention is a PVA/acid copolymer consisting essentially of the copolymer obtained by copolymerization of vinyl acetate with itaconic acid, followed by complete hydrolysis of the acetate moieties to yield the PVA/acid copolymer. For the purposes of the present invention, complete hydrolysis shall mean hydrolysis of at least about 95% of the acetate moieties. Preferably, the coating composition comprises from about 0.5% to about 20 wt % PVA solids relative to the weight of the pigment. More preferably, the coating composition comprises from about 1% to about 2 wt % PVA solids.

PVA copolymers of the present invention can be obtained by known and conventional methods. PVA is typically obtained by polymerization of vinyl acetate monomer, followed by conversion of the vinyl acetate polymer to the vinyl alcohol polymer. PVA copolymers are obtained by introducing one or more additional monomers into the polymerization vessel with vinyl acetate, and hence the term is inclusive of dipolymers, terpolymers, and/or higher degrees of copolymers. Terpolymers are obtained by copolymerization of three monomers.

As used herein, the term complete hydrolysis shall mean that a sufficient amount of reagent has been added to convert at least about 95%, preferably at least about 97%, and most preferably at least about 99% of the acetate groups of a polyvinyl acetate copolymer. PVA copolymers of the present invention may include other carboxylic acid or carboxylic ester functional groups. In such copolymers, vinyl alcohol moieties can react with acid or ester groups to form lactone functional groups. Therefore, in the practice of the present invention the extent of PVA hydrolysis is indicated by the presence of either or both vinyl alcohol and/or lactone structures. A PVA copolymer of the present invention can comprise some residual un-hydrolyzed acetate moieties. Preferably a PVA copolymer of the present invention comprises less than about 5 mol % residual acetate moieties, more preferably less than about 3 mol %, and most preferably less than about 1 mol %.

The PVA/acid copolymer of the present invention comprises from about 1 mol % to about 10 mol % itaconic acid. Preferably the PVA acid copolymer comprises from about 2 to about 8 mol % itaconic acid, and most preferably from about 3 to about 6 mol % itaconic acid.

The degree of polymerization of the PVA acid copolymer is from about 400 to about 4000. Preferably the degree of polymerization of the PVA copolymer is from about 500 to about 2000.

In another embodiment, the PVA acid copolymer of the present invention is a terpolymer comprising vinyl alcohol and itaconic acid components, and additionally comprising a second acid polymer component that is either an acrylic or methyl acrylate unit. A PVA mixed acid terpolymer of the present invention can be preferred in some cases. For the purposes of the present invention, functional equivalents of itaconic acid can include mono- and/or diesters of itaconic acid.

In another embodiment, the present invention is a method for preparing high solids aqueous paper coating compositions from a completely hydrolyzed PVA acid copolymer. In the practice of the present invention, the completely hydrolyzed PVA acid copolymer can be added as a dry solid to water, or alternatively added in any manner that will provide an aqueous PVA paper coating solution comprising less than 40 wt % water. In the practice of the present invention, a heating step is not required for effective dissolution of the PVA acid copolymer described herein.

The PVA paper coating solution composition can be prepared at a temperature of less than about 30° C. Particularly, the paper coating composition can be prepared at a temperature above about 15° C. up to and including a temperature of about 30° C. Preferably, paper coating composition can be prepared at a temperature of from about 18° C. to about 30° C.

The method of the present invention can comprise various other steps or procedures that are known and/or conventional in processes for preparing high solids paper coatings. Such steps as mixing or dispersing the components are considered conventional.

In still another embodiment, the present invention is an article comprising a coated paper, wherein the paper comprises a coating of a PVA acid copolymer, wherein the copolymer comprises itaconic acid.

In still another embodiment, the present invention is a polyvinyl alcohol terpolymer composition wherein the terpolymer comprises vinyl alcohol, an alkyl acrylate, and itaconic acid moieties. The terpolymer comprises at least about 90 mol % vinyl alcohol. Preferably the vinyl alcohol is present in an amount of at least about 91 mol %, more preferably the vinyl alcohol is present in an amount of at least about 92 mol %, and most preferably at least about 94 mol %. The terpolymer further comprises itaconic acid in an amount of from at least about 1.0 mol % up to about 9 mol %, and an alkyl acrylate is present in an amount of from at least about 1 mol % up to about 9 mol %.

Equivalents of itaconic acid can be useful in the practice of the present invention. For example, 2-acrylamido 2-methylpropane sulfonic acid (AMPS) is a commercially available monomer that can be used in the same manner as itaconic acid in the practice of the present invention. The preparation of PVA/AMPS copolymers is described in T. Moritani and J. Yamauchi, Polymer, v39, p 553-557 (1998). Terpolymers of the present invention can be obtained by including alkyl acrylates in the copolymerization reaction. The salt form of AMPS is preferably used in the practice of the present invention, and preferred for use is the sodium salt (SAMPS), although any organic salt form would suffice for use herein. AMPS salts such as SAMPS can be included in an amount of from 1 to 7 mol %, preferably from 2 mol % to 6 mol %, most preferably from 3 mol % to 5 mol %.

Alkyl acrylates suitable for use in the practice of the present invention include alkyl groups having from 1 to 10 carbon atoms. Such alkyl groups can be selected from the group consisting of methyl, ethyl, propyl, isopropyl, butyl isomers including iso-butyl, n-butyl, and t-butyl, and isomers of pentyl, hexyl, heptyl octyl, nonyl and decyl alkyl groups. Preferably the alkyl group has from 1 to 4 carbon atoms, more preferably from 1 to 3 carbon atoms, and most preferably the alkyl group is methyl.

A terpolymer composition as described herein is soluble in a cold aqueous solution at a temperature of less than or equal to about 25° C.

Without being held to theory, the terpolymer comprises an alkyl acrylate that essentially exists in the lactone form rather than in the acid or carboxylate form. In a composition of the present invention, itaconic acid can exist in various forms, such as an acid, salt, lactone, or any combination of these forms, depending on the chemical environment of the terpolymer. The capacity of the terpolymer to change form under various chemical conditions is contemplated herein, and does not negate the function of the presently claimed invention as described and practiced herein.

EXAMPLES

The Examples are for illustrative purposes only, and are not intended to limit the scope of the invention.

TABLE 1

Properties of Coated Paper

| Ex | Est. Coat Weight[1] (g/m$^2$) | Brightness[2] TAPPI (points) | Whiteness[2] CIE | Fluorescence[3] TAPPI (points) | Fluorescence vs. Base Paper |
|---|---|---|---|---|---|
| C1 | none | 86.9 | 82.9 | 2.0 | 0.0 |
| C2 | 12 | 87.9 | 82.3 | 1.0 | −1.0 |
| C3 | 12 | 89.8 | 89.1 | 3.0 | 1.0 |
| C4 | 12 | 90.4 | 92.2 | 4.0 | 2.0 |
| C5 | 12 | 90.5 | 92.6 | 4.1 | 2.1 |
| C6 | 12 | 90.5 | 93.1 | 4.4 | 2.4 |
| 1 | 12 | 90.3 | 92.1 | 4.1 | 2.1 |
| 2 | 12 | 90.2 | 92.0 | 4.1 | 2.1 |
| 3 | 12 | 90.3 | 92.4 | 4.2 | 2.2 |
| 4 | 12 | 90.5 | 92.3 | 4.0 | 2.0 |

[1]Laboratory hand draw-downs done on pre-coated wood-free paper base stock 2807-20.
[2]Testing done using Technidyne Brightimeter Micro S-5.
[3]Fluorescence was measured according to TAPPI standard test method T-452.

TABLE 2

| Example[1] | C2[2] | C3[2] | C4[2] | C5[2] | C6[2] | 1 | 2 | 3 | 4 |
|---|---|---|---|---|---|---|---|---|---|
| Ultrafine Ground CaCO$_3$ Omya Hydrocarb 90 | 80.0 | 80.0 | 80.0 | 80.0 | 80.0 | 80.0 | 80.0 | 80.0 | 80.0 |
| Fine Particle Size Kaolin Clay, Huber Hydragloss 90 | 20.0 | 20.0 | 20.0 | 20.0 | 20.0 | 20.0 | 20.0 | 20.0 | 20.0 |
| SBR Latex, BASF Styronal ND656 | 10.5 | 10.5 | 10.5 | 10.5 | 10.5 | 10.5 | 10.5 | 10.5 | 10.5 |
| CMC, Noviant Finnfix 10, from solution | 1.0 | 1.0 | 1.0 | 1.0 | 1.0 | 1.0 | 1.0 | 1.0 | 1.0 |
| Polyvinyl Alcohol, from solution | — | — | 1.0 | 1.5 | 2.0 | — | — | — | — |
| Polyvinyl Alcohol, from dry | 0.0 | 0.0 | — | — | — | 1.0 | 1.0 | 1.0 | 1.0 |
| OBA, Blancophor P | 0.0 | 1.0 | 1.0 | 1.0 | 1.0 | 1.0 | 1.0 | 1.0 | 1.0 |
| pH target | 8.5-9.0 | 8.5-9.0 | 8.5-9.0 | 8.5-9.0 | 8.5-9.0 | 8.5-9.0 | 8.5-9.0 | 8.5-9.0 | 8.5-9.0 |

[1]The concentration of latex, CMC, polyvinyl alcohol, and Blancophor ™ P OBA are based on 100 parts pigment. The target coating solids was 65%. Celvol ® 203S (Celanese) is a ground, partially hydrolyzed very low viscosity polyvinyl alcohol. Celvol 103 (Celanese) is a fully hydrolyzed very low viscosity polyvinyl alcohol. The Celvol materials were added as solutions to make sure the comparison was to fully dissolved Celvol material.
[2]Not an example of the present invention.

These example numbers correspond to Table I

Comparative Example 1 (C1)

An uncoated base paper was tested for Brightness, Whiteness, Hunter Color, and TAPPI Fluorescence, giving the results shown in Table 1.

Comparative Example 2 (C2)

A coating was made without any polyvinyl alcohol or fluorescent dye applied to the base sheet and tested.

Comparative Example 3 (C3)

The surface of an uncoated basepaper substrate was coated with 12 g/m$^2$ with the coating described in Table 2 with fluorescent dye and CMC but no polyvinyl alcohol promoter. The coated paper was tested for Brightness, Whiteness, Color, and Fluorescence, giving the results shown in Table 1.

Comparative Example 4 (C4)

The process of Example C3 was repeated except that in addition 1.0 parts per hundred of Celvol 203S solution was included in the mixture.

Comparative Example 5 (C5)

The process of Example C3 was repeated except that in addition 1.5 parts per hundred of Celvol 203S solution was included in the mixture.

Comparative Example 6 (C6)

The process of Example C3 was repeated except that in addition 2.0 parts per hundred of Celvol 103 solution was included in the mixture.

Example 1

The process of Example C3 was repeated except that in addition 1.0 parts per hundred of 6.4 mole % Itaconic acid copolymer, 60% neutralization was added dry to the mixture.

Example 2

The process of Example C3 was repeated except that in addition 1.0 parts per hundred of 4.2 mole % itaconic acid copolymer, 60% neutralization was included in the mixture as a dry component.

Example 3

The process of Example C3 was repeated except that in addition 1.0 parts per hundred of 1.8 mole % itaconic acid copolymer, 40% neutralization was added dry to the mixture.

Example 4

The process of Example C3 was repeated except that in addition 1.0 parts per hundred of 2.7 mole % itaconic acid, 2.9 mole % methyl acrylate copolymer, 30% neutralization was added dry to the mixture.

Example 5

A 2 L polymer kettle was assembled with an overhead stirrer, a Claisen head with a multi-inlet port fitting connected to 2 syringe pumps and a tap—H2O condenser further attached to a N2 bubbler, an overhead thermowell with a thermocouple device, and a septum. The agitator was a single PTFE paddle and the stir rate was set to 80 rpm. The kettle was charged with 1000 g vinyl acetate (Aldrich Chemical co., Milwaukee, Wis., USA) 401 g MeOH (EM Science), 1.5 g itaconic acid (Aldrich), and 0.6 g methyl acrylate (Aldrich) then degassed at rt for 20 minutes with a sparging tube. The kettle was then heated to reflux (ca. 65° C.) with an oil bath. Syringe pump #1 was charged with neat methyl acrylate. Syringe pump #2 was charged with a 24.7 wt % solution of itaconic acid in MeOH. 2 g of VAZO-64 (DuPont, Wilmington, Del., USA) dissolved in 100 g of MeOH was added to the reactor. Syringe pump #1 was then activated to feed at 0.0262 cc/min and syringe pump #2 was activated to feed at 0.46 cc/min. The polymerization was refluxed for 159 minutes, then a solution of sodium nitrite (Aldrich) in 80 g of MeOH was added all at once to halt the polymerization. The solids were determined to be 17.8% at this time. The polymer is thus 4.1 mol % itaconic acid and 1.6 mol % methyl acrylate. The polyvinyl acetate terpolymer was transferred to a 3 L round bottom flask. The flask was attached to a rotary evaporator and MeOH/vinyl acetate azeotrope was removed at reduced pressure. Addition of 500 g of MeOH followed by azeotropic distillation was repeated 3 times, at which time removal of vinyl acetate was judged substantially complete. The polyvinyl acetate was dissolved in 700 g of MeOH and charged to a 1 gallon explosion-proof stainless steel blender (Eberbach Corp., Ann Arbor, Mich.). The blender was set to stir at 10,000 rpm then 430 g of 25 wt % sodium methoxide in methanol (Aldrich) was added through a small hole in the blender's cover. The ensuing heterogeneous mixture was stirred for 10 minutes, then 143 g of glacial acetic acid (EM Science) was slowly added. The mixture was stirred 2 minutes, then filtered. The polymer product was rinsed 3 times with MeOH and once with acetone, then dried in a vacuum oven at 80° C. overnight. 151 g of white terpolymer powder were isolated. The viscosity was determined to be 21.8 mPa-s (cP) (4% solids aqueous solution at 20° C. (68° F.), determined by Hoeppler falling ball method). Infrared analysis in ATR mode of the polymer showed the presence of a lactone carbonyl peak at 1745 $cm^{-1}$, an acid carboxyl at 1705 $cm^{-1}$, and a sodium carboxylate at 1572 $cm^{-1}$.

Examples 6-10 were prepared in the same manner as described for Example 5, except that the polymerization time was 175 minutes and the precharge and feed rates of itaconic acid (IA) and methyl acrylate (MA) were modified as shown in Table 3.

The itaconic acid copolymer of Example 11 was prepared by precharging the vessel with 1.41 g IA and 1.46 g MA then feeding a mixture of 21.3:14.4:64.3 solution of IA:MA:MeOH at 0.393 cc/min for 163 minutes.

Itaconic acid copolymers of Examples 12-14 were prepared as described in Example 5 except that polymerizations were halted after 175, 134, and 159 minutes, respectively. The copolymers of Examples 1 and 2 were prepared on a 20 liter scale, feeding IA comonomer at a rate to afford 6.4 and 4.2 mol % comonomer, respectively.

TABLE 3

| Example | IA Pre-charge (g) | MA Pre-charge (g) | MeOH Pre-charge (g) | Pump 1 (cc/min.) | Pump 2 (cc/min.) | IA mol % | MA mol % |
|---|---|---|---|---|---|---|---|
| 6 | 1.24 | 0.72 | 400 | 0.0314 | 0.368 | 2.3 | 1.4 |
| 7 | 1.51 | 0.83 | 400 | 0.0380 | 0.442 | 2.9 | 1.7 |
| 8 | 1.49 | 1.47 | 400 | 0.064 | 0.442 | 3.0 | 3.0 |
| 9 | 1.00 | 2.50 | 400 | 0.11 | 0.300 | 2.1 | 5.4 |
| 10 | 1.40 | 1.48 | 420 | 0.066 | 0.425 | 2.7 | 2.9 |
| 11 | 1.41 | 1.46 | 420 | see text | see text | 2.0 | 2.1 |
| 12 | 1.41 | 0 | 400 | 0 | 0.41 | 2.4 | 0 |
| 13 | 2.43 | 0 | 400 | 0 | 0.26 | 1.8 | 0 |
| 14 | 2.41 | 0 | 400 | 0 | 0.46 | 3.1 | 0 |

Example 15

Test of solubility of polymers. The cold water solubility of the resins was measured by charging a 20 mL vial with 50 mg of polymer, a magnetic stir-bar, and 3.0 mL of deionized water. The mixture was stirred at 22-25° C. and the time to dissolve>95% of the polymer was measured. The results are tabulated in Table 4.

C7 is a 5-6 mol % methyl acrylate polyvinyl alcohol copolymer, >99% hydrolyzed, 17-23 cP viscosity.

C8 is a commercially available polyvinyl alcohol homopolymer, ca. 88% hydrolyzed, which is cold water soluble and is equivalent to Celvol 203S.

C9 is a polyvinyl alcohol homopolymer>99% hydrolyzed with 27-33 cP viscosity.

Methyl acrylate copolymer or homopolymer are not cold water soluble.

TABLE 4

| Polymer of Example | IA mol % | MA mol % | Dissolution time |
|---|---|---|---|
| 6 | 2.3 | 1.4 | 30 min. |
| 7 | 2.9 | 1.7 | 30 min. |
| 8 | 3.0 | 3.0 | 30 min. |
| 9 | 2.1 | 5.4 | 17 min. |
| 10 | 2.7 | 2.9 | 10 min. |
| 11 | 2.0 | 2.1 | 24 min. |
| 12 | 2.4 | 0 | 20 min. |
| 13 | 1.8 | 0 | 5 days |
| 14 | 3.1 | 0 | 20 min. |
| C7 | 0 | 5-6 | insoluble |
| C8 | 0 | 0 | 4 min. |
| C9 | 0 | 0 | insoluble |

What is claimed is:

1. A method of coating a paper article comprising the steps of: (1) preparing a high-solids paper coating composition having an aqueous phase, by adding to water, as a dry solid component, a copolymer comprising units of vinyl alcohol, alkyl acrylate, itaconic acid and optionally vinyl acetate, said copolymer comprising i) less than about 5 mol % vinyl acetate units; (ii) about 1 mol % to about 9 mol % itaconic acid units: (iii) at least about 90 mol % vinyl alcohol units and (iv) about 1 mol % to about 9 mol % alkyl acrylate units; thereby forming a paper coating composition wherein said copolymer is completely dissolved in said aqueous phase of the paper coating composition and wherein the amount of water present in said aqueous phase is such that the concentration of water in the paper coating composition is less than 40% by weight, based on the total weight of the paper coating composition and (2) applying the paper coating composition to the surface of a paper article.

2. A method of claim 1 wherein the alkyl acrylate units of the copolymer are present in the form of lactones.

3. A method of claim 1 wherein said paper coating composition is a solution.

4. A method of claim 1 wherein said paper coating composition is an aqueous mixture.

5. A method of claim 4 wherein said aqueous mixture is selected from the group consisting of aqueous slurries, aqueous dispersions and aqueous suspensions.

6. A method of claim 1 wherein the alkyl groups of said alkyl acrylate units have from 1 to 10 carbon atoms.

7. A method of claim 6 wherein the alkyl groups of the alkyl acrylate units have from 1 to 3 carbon atoms.

8. A method of claim 7 wherein the alkyl groups of the alkyl acrylate units have 1 carbon atom.

9. A method of claim 1 wherein the copolymer comprises less than about 3 mol % vinyl acetate units.

10. A method of claim 9 wherein the copolymer comprises less than about 1 mol % vinyl acetate units.

11. A method of claim 1 wherein the paper coating composition is prepared at a temperature of less than 30° C.

12. A method of claim 1 wherein the copolymer is soluble in the aqueous phase at a temperature of less than or equal to 25° C.

13. A method of claim 1 wherein the copolymer is at least about 95% hydrolyzed.

* * * * *